United States Patent
Benedict et al.

(10) Patent No.: US 10,528,509 B2
(45) Date of Patent: Jan. 7, 2020

(54) EXPANSION BUS DEVICES COMPRISING RETIMER SWITCHES

(71) Applicant: Hewlett Packard Enterprise Development LP, Houston, TX (US)

(72) Inventors: Melvin K. Benedict, Magnolia, TX (US); Glenn H. Lupton, Hollis, NH (US); Michael L. Sabotta, Houston, TX (US); Brian T. Purcell, Tomball, TX (US); Patrick Raymond, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/065,877

(22) PCT Filed: Jan. 29, 2016

(86) PCT No.: PCT/US2016/015646
§ 371 (c)(1),
(2) Date: Jun. 25, 2018

(87) PCT Pub. No.: WO2017/131741
PCT Pub. Date: Aug. 3, 2017

(65) Prior Publication Data
US 2019/0012286 A1   Jan. 10, 2019

(51) Int. Cl.
*G06F 13/40* (2006.01)

(52) U.S. Cl.
CPC ...... *G06F 13/4022* (2013.01); *G06F 13/4068* (2013.01); *G06F 13/4081* (2013.01)

(58) Field of Classification Search
CPC combination set(s) only.
See application file for complete search history.

(56) References Cited

U.S. PATENT DOCUMENTS

| | | | |
|---|---|---|---|
| 7,802,020 B2 | 9/2010 | Wong | |
| 7,881,323 B2 | 2/2011 | Wong et al. | |
| 8,576,570 B2 * | 11/2013 | Nguyen | G06F 1/181 361/725 |
| 8,806,085 B2 | 8/2014 | Mathason et al. | |
| 2007/0067541 A1 * | 3/2007 | Chang | G06F 13/409 710/307 |
| 2007/0139422 A1 | 6/2007 | Kong | |

(Continued)

FOREIGN PATENT DOCUMENTS

| | | |
|---|---|---|
| EP | 2521971 A1 | 11/2012 |
| WO | WO-2015038120 A1 | 3/2015 |

OTHER PUBLICATIONS

International Search Report and Written Opinion, dated Oct. 27, 2016, PCT/US2016/015646, 13 pages.

*Primary Examiner* — Raymond N Phan
(74) *Attorney, Agent, or Firm* — Trop, Pruner & Hu, P.C.

(57) ABSTRACT

The present disclosure discloses an expansion bus device that is communicatively coupled to a plurality of input-output devices. The expansion bus device includes a plurality of input-output slots, via which the plurality of input-output devices are coupled to the expansion bus device. The expansion bus device also includes a retimer switch communicatively connected to each of the plurality of input-output slots. The retimer switch supports switching between the plurality of input-output slots.

20 Claims, 11 Drawing Sheets

(56) References Cited

U.S. PATENT DOCUMENTS

| | | |
|---|---|---|
| 2014/0156897 A1 | 6/2014 | Reinke |
| 2014/0173149 A1* | 6/2014 | Walker ................ G06F 9/45533 |
| | | 710/263 |
| 2014/0223064 A1 | 8/2014 | Wang |
| 2015/0347345 A1 | 12/2015 | Hellriegel |
| 2016/0170928 A1* | 6/2016 | Tamarkin .............. G06F 13/409 |
| | | 710/313 |

* cited by examiner

EXPANSION BUS DEVICES COMPRISING RETIMER SWITCHES

BACKGROUND

Many computing platforms utilize expansion bus architectures for connecting host devices (e.g., processors and memories) to input-output (I/O) devices. For example, expansion bus architectures may be used in end user computers to connect processors and memories to various computer peripheral devices (e.g., network interface cards (NICs), storage devices, sound cards, graphics processors, or the like). Similarly, expansion bus architectures may be used in network elements, such as servers and switches, to connect processors and memories to various network element I/O devices (e.g., line cards, server blades of multi-node enclosures, fabric switch blades of multi-tray enclosures, storage devices, controllers, or the like). However, flexible computing platforms having flexible expansion bus architectures are generally difficult and expensive to both design and implement.

DETAILED DESCRIPTION

The present disclosure discloses an apparatus, such as an expansion bus device, for a computing device having a plurality of host devices and a plurality of input-output (I/O) devices. The expansion bus device may communicatively connect the host devices of the computing device and the I/O devices of the computing device. The expansion bus device may include a plurality of host interface devices to be connected to the host devices of the computing device and a plurality of I/O slots to support the I/O devices of the computing device. The expansion bus device may further include a retimer switch (i.e., a switch, such as a circuit switch application-specific integrated circuit, combined with a retimer) to communicatively connect the host interface devices of the expansion bus device and the I/O slots of the expansion bus device, thereby communicatively connecting the host devices of the computing device and the I/O devices of the computing device. The retimer switch may provide various functions for signals traversing the expansion bus device (e.g., signal switching functions, signal retiming functions, signal conditioning, or the like, as well as various combinations thereof). The expansion bus device may be implemented using various types of expansion bus architectures, such as Peripheral Component Interconnect (PCI), PCI Express (PCIe), InfiniBand, or the like. The use of the expansion bus device within the computing device may provide greater length and flexibility for the expansion bus architecture of the computing device.

In further examples, the present disclosure can be extended to provide more flexible configurations of I/O devices (e.g., graphics processing units, programmable logic devices, etc.). For instance, in one example, the present disclosure can be implemented to provide a reconfigurable array of graphics processing units (GPUs). In this case, a second expansion bus device implementing a retimer switch can be used to switch a set of GPUs among multiple configurations. As an example, the second expansion bus device may be implemented based on an expansion bus architecture that is designed to provide high-speed (e.g., faster than 10 megabits per second (Mbps), or several times faster than PCIe architecture) communication between the GPUs, or between the GPUs and at least one CPU.

Figure 1:
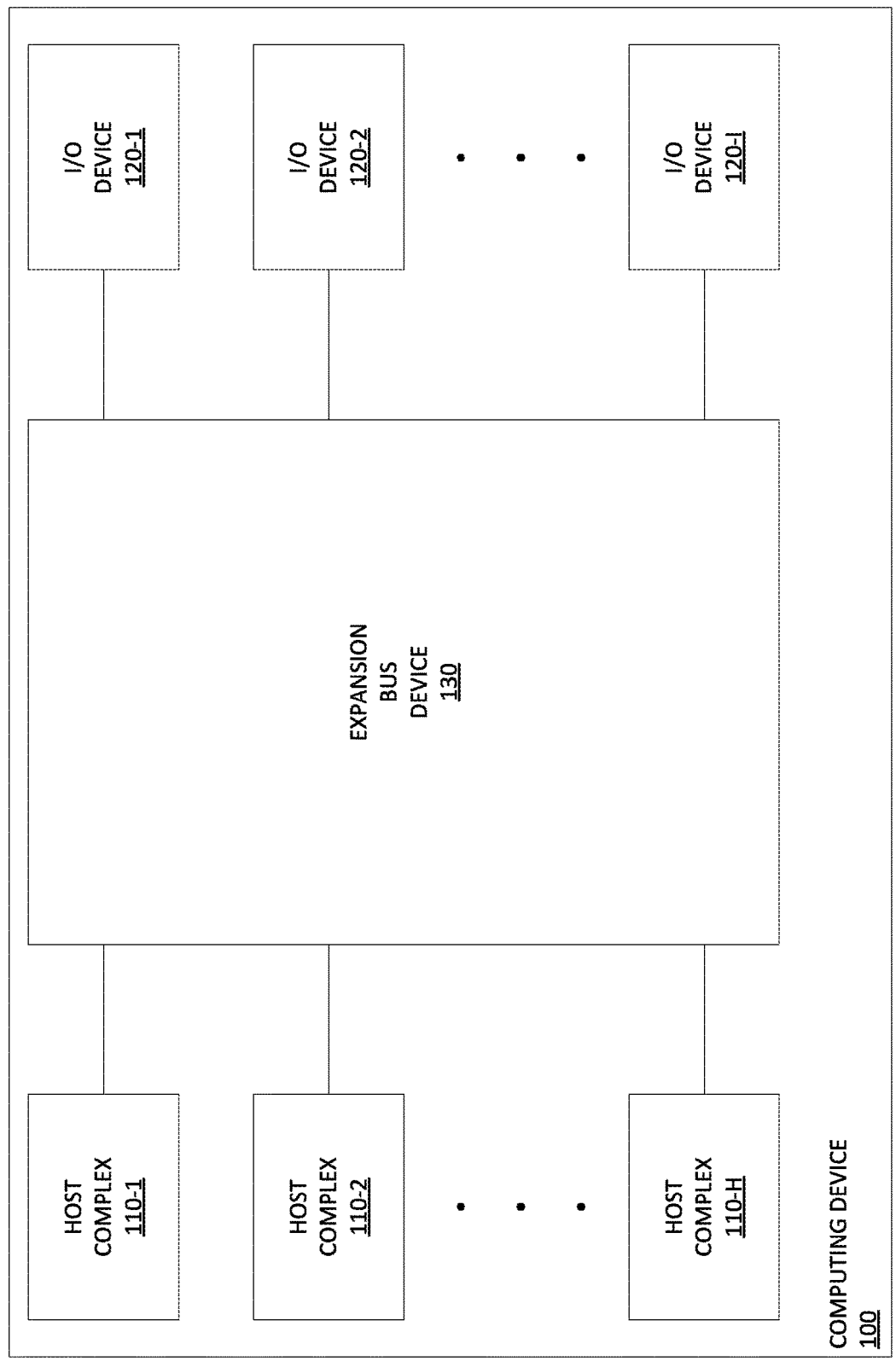
FIG. 1 is a block diagram of an example computing device including an expansion bus device of the present disclosure.

FIG. 1 is a block diagram of an example computing device 100 of the present disclosure. The computing device 100 provides various computing functions. The computing functions supported by the computing device 100 may depend on the device type of the computing device. In one example, the computing device 100 may be an end user device (e.g., a desktop computer, a laptop computer, a tablet, a smartphone, or the like). In one example, the computing device 100 may be a network element (e.g., a server, a packet switch, or the like). As discussed further below, computing device 100 supports an expansion bus architecture. The computing device 100 may be any other type of computing device which may utilize an expansion bus architecture.

The computing device 100 includes a plurality of host complexes 110-1-110-H (collectively, host complexes 110), a plurality of I/O devices 120-1-120-I (collectively, I/O devices 120), and an expansion bus device 130.

The host complexes 110 represent groups of host devices of computing device 100. The host complexes 110 may each include at least one host device (e.g., a processor, a memory, or the like), which has been omitted from FIG. 1 for purposes of clarity. For example, a host complex 110 may include a processor, multiple processors, a memory, multiple memories, a controller, or the like, as well as various combinations thereof. The implementation of host complexes 110 may depend on the device type of the computing device 100, as well as other factors. The host complexes 110-1-110-H are communicatively connected to expansion bus device 130 via a plurality of host complex interfaces which may support communications between host complexes 110 and expansion bus device 130 at various levels of granularity (e.g., per port, per communication path where the ports support multiple communication paths, or the like), which may depend on various factors (e.g., the type of expansion bus architecture used by the expansion bus device 130, the number of host devices included within each of the host complexes 110, or the like).

The I/O devices 120 are I/O devices which may be used with computing device 100. The I/O devices 120 may be inserted within I/O slots (omitted from FIG. 1 for purposes of clarity) of computing device 100. The I/O devices 120 may provide various functions within the context of computing device 110. The types of I/O devices 120 which may be used by computing device 100 may vary for different implementations of computing device 100. In an example in which computing device 100 is an end user device, the I/O devices 120 may include network interface cards (NICs), storage devices, sound cards, graphics processors, or the like. In an example in which computing device 100 is a server, the I/O devices 120 may include server blades, storage devices, or the like. In an example in which computing device 100 is a packet switch, the I/O devices 120 may include line cards, storage devices, or the like. The I/O devices 120 may include various other types of I/O devices. The I/O devices 120-1-120-I are communicatively connected to the expansion bus device 130 via a plurality of I/O device interfaces which may support communications between I/O devices 120 and expansion bus device 130 at various levels of granularity (e.g., per port, per communication path where the ports support multiple communication paths, or the like), which may depend on various factors (e.g., the type of expansion bus architecture used by the expansion bus device 130, the device type of the I/O device 120, or the like).

The expansion bus device 130 supports communications within the computing device 100. The expansion bus device 130 supports communications between host complexes 110 and I/O devices 120. As discussed herein, expansion bus device 130 is communicatively connected to the host complexes 110-1-110-H via respective host complex interfaces and is communicatively connected to the I/O devices 120-1-120-I via respective I/O device interfaces, for supporting communications between host complexes 110 and I/O devices 120. The expansion bus device 130 may support bidirectional communications between host complexes 110 and I/O devices 120. The expansion bus device 130 provides switching of signals between host complexes 110 and I/O devices 120, where the switching may be provided at various granularities (e.g., per port, per communication path, or the like). The expansion bus device 130 provides retiming functions for signals communicated between host complexes 110 and I/O devices 120. The expansion bus device 130 may provide signal conditioning for signals communicated between host complexes 110 and I/O devices 120. The expansion bus device 130 may provide various other functions for signals communicated between host complexes 110 and I/O devices 120. The expansion bus device 130 may be implemented based on any suitable expansion bus architecture, such as PCI, PCIe, InfiniBand, or the like. An example of expansion bus device 130 is depicted and described with respect to FIG. 2.

Figure 2:
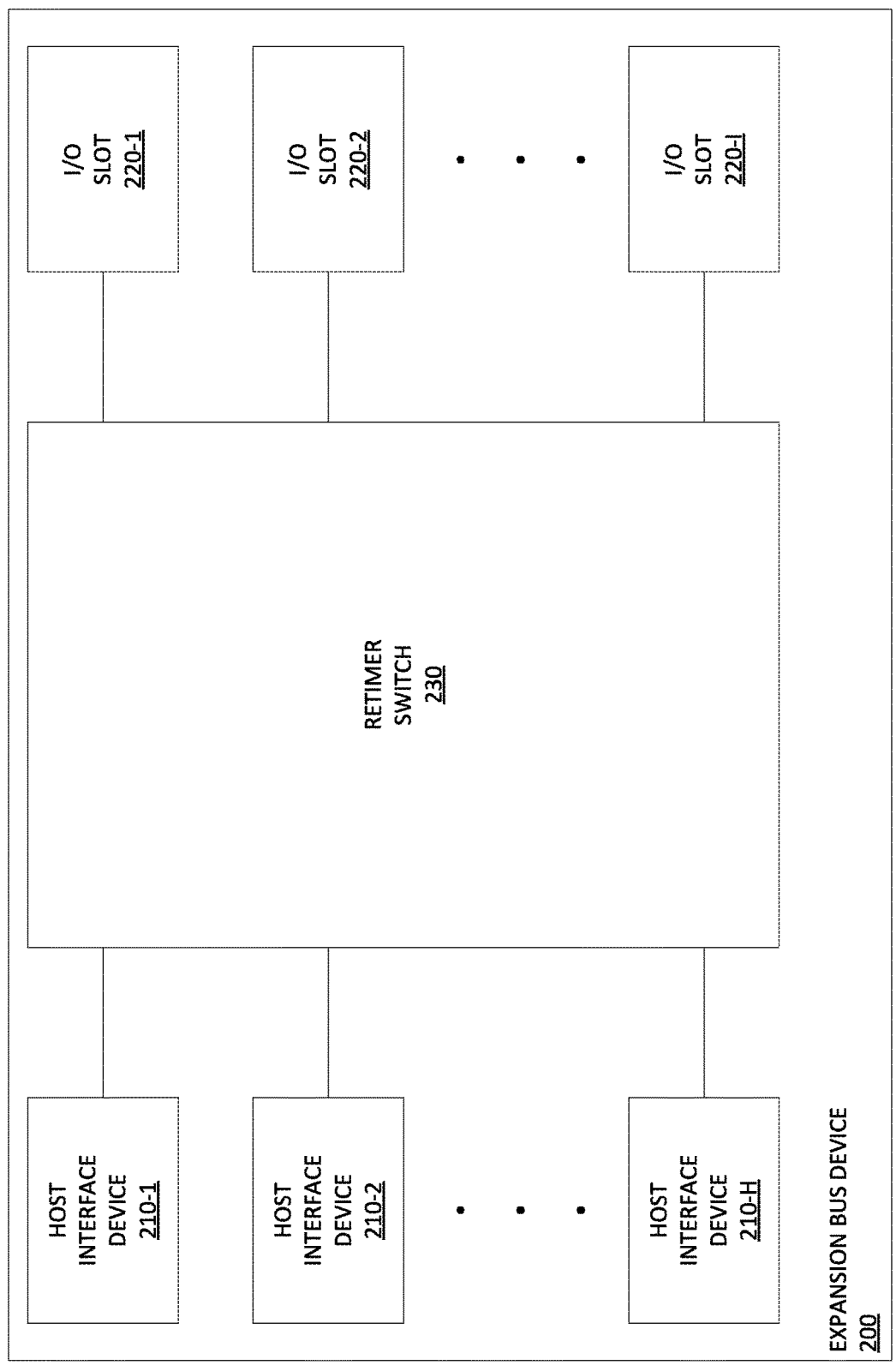
FIG. 2 is a block diagram of an example expansion bus device including a retimer switch of the present disclosure.

FIG. 2 is a block diagram of an example expansion bus device including a retimer switch of the present disclosure. In one example, expansion bus device 200 of FIG. 2 may be used as expansion bus device 130 of FIG. 1.

The expansion bus device 200 includes a plurality of host interface devices 210-1-210-H (collectively, host interface devices 210), a plurality of I/O slots 220-1-220-I (collectively, I/O slots 220), and a retimer switch 230. As discussed herein, expansion bus device 200 may be implemented using any suitable expansion bus architecture (e.g., PCI, PCIe, InfiniBand, or the like) and, thus, host interface devices 210, I/O slots 220, and retimer switch 230 also may be implemented using any suitable expansion bus architecture.

The host interface devices 210 provide host interface functions for host complexes (e.g., host interface devices 210-1-210-H may provide host interface functions for the host complexes 110-1-110-H of FIG. 1, respectively). The host interface devices 210 function as communication interfaces between respective host complexes (omitted from FIG. 2 for purposes of clarity) and the I/O slots 220. The host interface devices 210 are communicatively connected to the retimer switch 230. The host interface devices 210 support bidirectional communication between the respective host complexes and the I/O slots 220 via retimer switch 230. As discussed herein, the host interface devices 210 may be implemented based on any suitable expansion bus architecture. For example, in the case of PCI, the host interface devices 210 may be PCI bridges. For example, in the case of PCIe, the host interface devices 210 may be PCIe root complexes. For example, in the case of Infiniband, the host interface devices 210 may be host channel adapters (HCAs). It is noted that, although omitted from FIG. 2 for purposes of clarity, each of the host interface devices 210 may include at least one host interface device port which may be physically connected to the retimer switch 230. It is further noted that each of the host interface device ports of the host interface devices 210 may support communication at various granularities, such as per port, per communication path where the ports support multiple communication paths (which may be referred to as lanes in PCIe expansion bus architectures or using other terminology for other types of expansion bus architectures), or the like.

The I/O slots 220 receive I/O devices which may be inserted into the I/O slots 220 (e.g., I/O slots 220-1-220-I may receive I/O devices 120-1-120-I of FIG. 1, respectively). The I/O slots 220 function as communication interfaces between respective I/O devices (omitted from FIG. 2 for purposes of clarity) and the host interface devices 210. The I/O slots 220 are communicatively connected to the retimer switch 230. The I/O slots 220 support bidirectional communication between the respective I/O devices and the host interface devices 210 via retimer switch 230. As discussed herein, the I/O slots 220 may be implemented based on any suitable expansion bus architecture. For example, the I/O slots 220 may be PCI slots, PCIe slots, InfiniBand slots, or the like. It is noted that, although omitted from FIG. 2 for purposes of clarity, each I/O slot 220 may include at least one I/O slot port which may be physically connected to the retimer switch 230. It is further noted that each of the I/O slot ports of the I/O slots 220 may support communication at various granularities, such as per port, per communication path where the ports support multiple communication paths (which may be referred to as lanes in PCIe expansion bus architectures or using other terminology for other types of expansion bus architectures), or the like.

The retimer switch 230 supports communications within expansion bus device 200 (and, thus, within a computing device within which expansion bus device 200 is disposed, such as computing device 100 of FIG. 1). The retimer switch 230 is communicatively connected to the host interface devices 210 (and, thus, the associated host complexes supported by host interface devices 210) and the I/O slots 220 (and, thus, the associated I/O devices inserted within the I/O slots 220). The retimer switch 230 performs switching of signals between the host interface devices 210 and the I/O slots 220 (and, thus, between host complexes associated with the host interface devices 210 and I/O devices inserted within the I/O slots 220). The retimer switch 230 may include a switching fabric (omitted from FIG. 2 for purposes of clarity) for switching signals between the host interface devices 210 and the I/O slots 220, which may be a crossbar type switching fabric or any other suitable type of switching fabric. The retimer switch 230 provides retiming for signals communicated between the host interface devices 210 and the I/O slots 220. The retimer switch 230 may provide signal conditioning for signals communicated between host interface devices 210 and the I/O slots 220. The retimer switch 230 may provide various other functions for signals communicated between the host interface devices 210 and the I/O slots 220, which may depend on the type of expansion bus architecture used by the expansion bus device 200.

The retimer switch 230, as discussed above, is communicatively connected to host interface devices 210 and is communicatively connected to the I/O slots 220. In FIG. 2, this is depicted as a plurality of communication interfaces communicatively connecting the respective host interface devices 120 and the retimer switch 230 and a plurality of communication interfaces communicatively connecting the respective I/O slots 220 and the retimer switch 230. The manner in which retimer switch 230 is connected to the host interface devices 210 and to the I/O slots 220 may depend on various factors, such as the type of expansion bus architecture used by expansion bus device 200, the level of switching flexibility to be provided by expansion bus device 200, or the like, as well as various combinations thereof. For example, where the expansion bus architecture of the expansion bus device 200 is a PCI architecture, the host interface device ports of the host interface devices 210 may be connected to the retimer switch 230 on a per-port basis and, similarly, the I/O slot ports of the I/O slots 220 may be connected to the retimer switch 230 on a per-port basis. For example, where the expansion bus architecture of expansion bus device 200 is a PCIe expansion bus architecture, the host interface device ports of the host interface devices 210 and the I/O slot ports of the I/O slots 220 may support various numbers of communication paths (typically referred to as lanes in PCIe expansion bus architectures), and the host interface devices 210 and I/O slots 220 may be connected to the retimer switch 230 on a per port basis, a per lane basis, or the like, as well as various combinations thereof. In other words, a communication interface that is communicatively connecting a host interface device 210 to the retimer switch 230 may represent at least one physical connection between the host interface device 210 and the retimer switch 230 and, similarly, a communication interface that is communicatively connecting an I/O slot 220 to the retimer switch 230 may represent at least one physical connection between the I/O slot 220 and the retimer switch 230. Accordingly, the communication interfaces depicted in FIG. 2 may represent various ways in which the host interfaces devices 210 and the I/O slots 220 may be communicatively connected to the retimer switch 230 in order to support communications between the host interface devices 210 and the I/O slots 220. Examples of expansion bus device 200 in which per port communication is supported and in which per communication path communication is supported are depicted and described with respect to FIG. 3 and FIG. 4, respectively.

Figure 3:
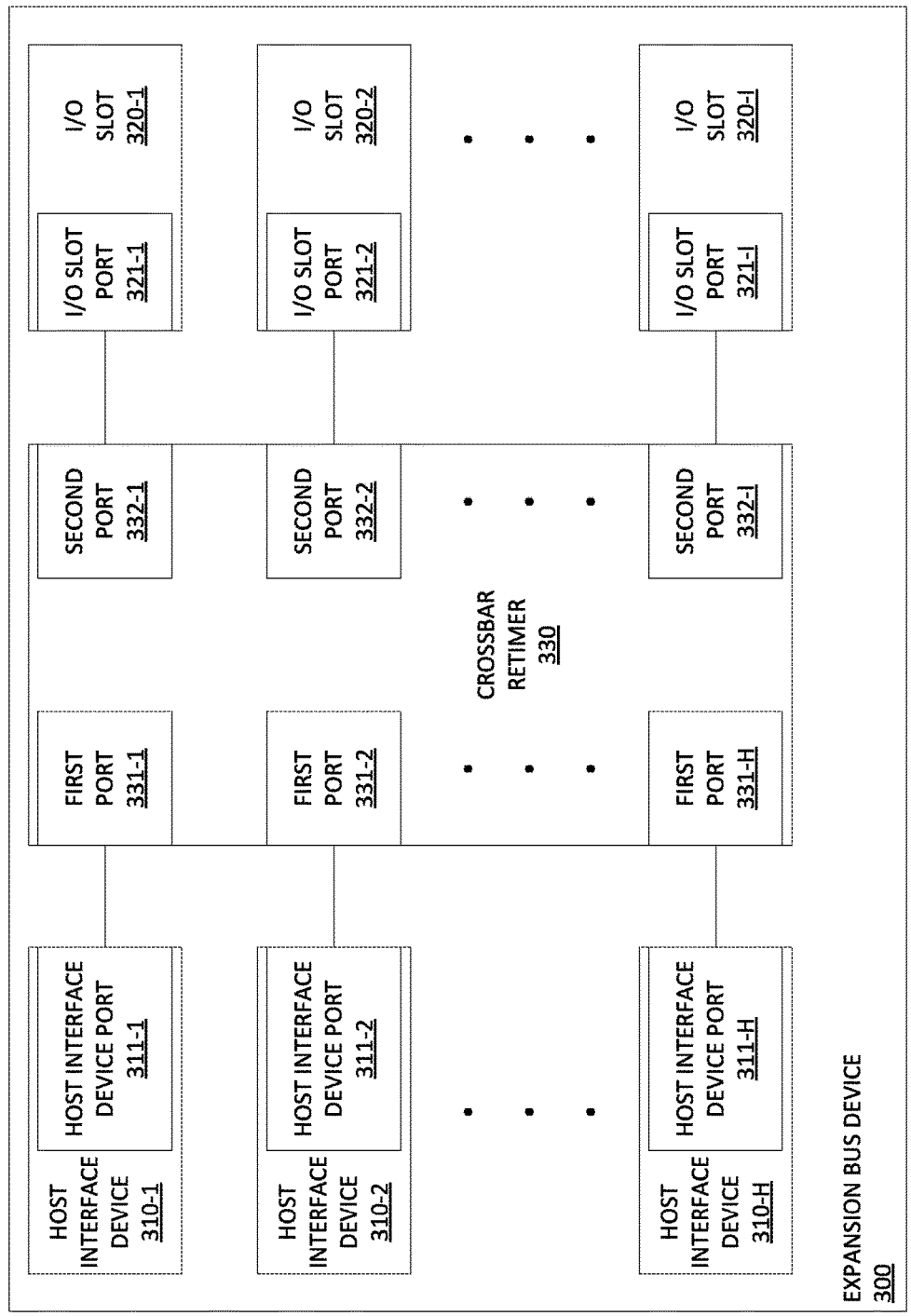
FIG. 3 is a block diagram of an example expansion bus device of the present disclosure in which per port communication is supported.

FIG. 3 is a block diagram of an example expansion bus device of the present disclosure in which per port communication is supported. In one example, expansion bus device 300 of FIG. 3 may be used as the expansion bus device 200 of FIG. 2. The expansion bus device 300 supports communications on a per port basis.

The expansion bus device 300 includes a plurality of host interface devices 310-1-310-H (collectively, host interface devices 310), a plurality of I/O slots 320-1-320-I (collectively, I/O slots 320), and a crossbar retimer 330. The host interface devices 310 are similar to the host interface devices 210 of FIG. 2 and the I/O slots 320 are similar to the I/O slots 220 of FIG. 2.

The host interface devices 310-1-310-H include a plurality of host interface device ports 311-1-311-H (collectively, host interface device ports 311), respectively. The I/O slots 320-1-320-I include a plurality of I/O slot ports 321-1-321-I (collectively, I/O slot ports 321), respectively. The crossbar retimer 330 includes a plurality of first ports 331-1-331-H (collectively, first ports 331) which are communicatively connected to the respective host interface device ports 311-1-311-H and also includes a plurality of second ports 332-1-332-I (collectively, second ports 332) which are communicatively connected to the respective I/O slot ports 321-1-321-I.

The crossbar retimer 330 may communicatively connect any of the first ports 331 of crossbar retimer 330 and any of the second ports 332 of crossbar retimer 330 and, thus, to communicatively connect any of the host interface devices 310 to any of the I/O slots 320.

Although primarily depicted and described in FIG. 3 with respect to an example of FIG. 2 in which retimer switch 230 of FIG. 2 is a crossbar retimer (illustratively, using crossbar retimer 330 as retimer switch 230 of FIG. 2), other types of retimer switches using other types of switching fabrics may be used.

Figure 4:
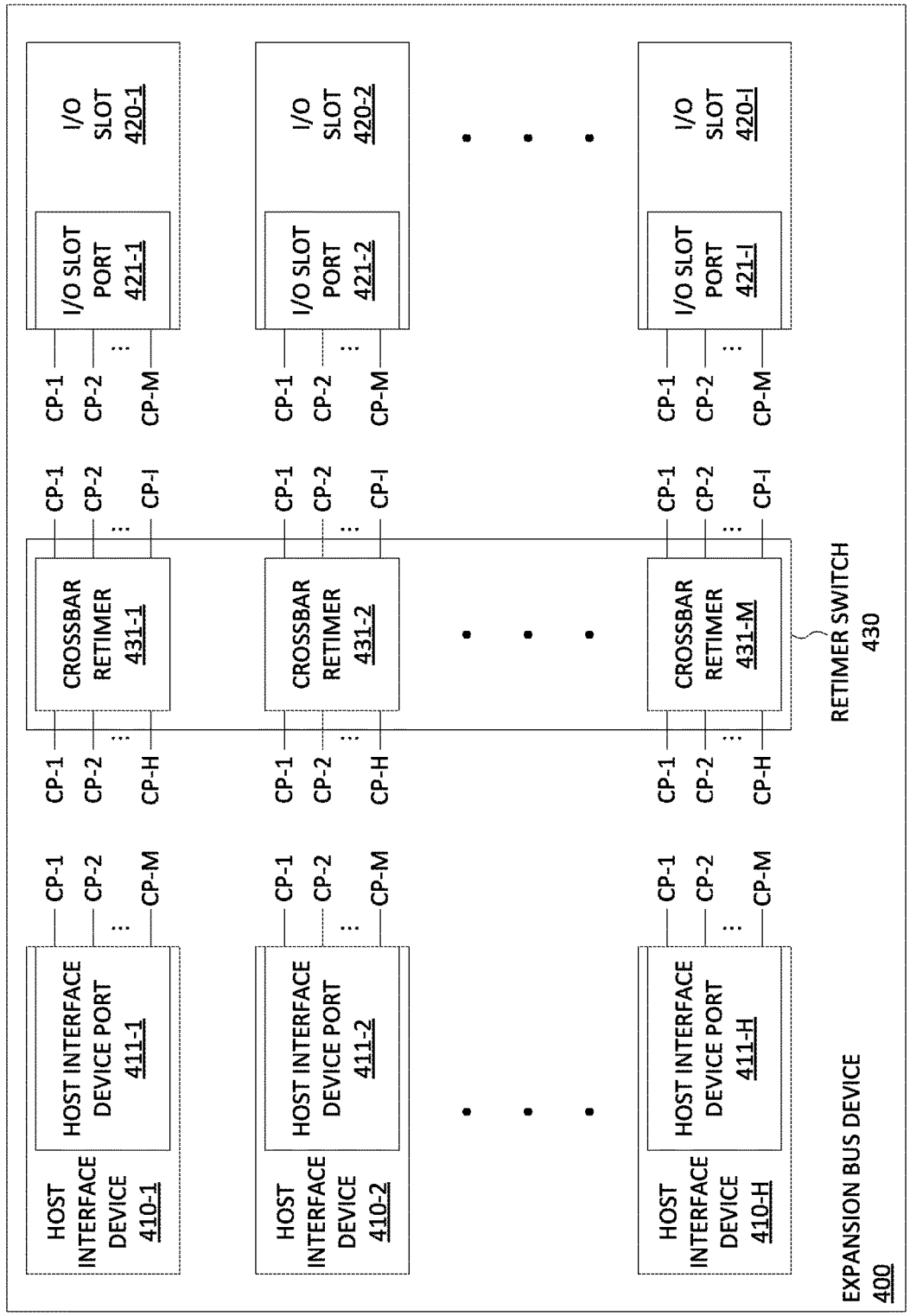
FIG. 4 is a block diagram of an example expansion bus device of the present disclosure in which per communication path communication is supported.

FIG. 4 is a block diagram of an example expansion bus device of the present disclosure in which per communication path communication is supported. In one example, expansion bus device 400 of FIG. 4 may be used as the expansion bus device 200 of FIG. 2. The expansion bus device 400 supports communications on a per communication path basis.

The expansion bus device 400 includes a plurality of host interface devices 410-1-410-H (collectively, host interface devices 410), a plurality of I/O slots 420-1-420-I (collectively, I/O slots 420), and retimer switch 430. The host interface devices 410 are similar to the host interface devices 210 of FIG. 2 and the I/O slots 420 are similar to the I/O slots 220 of FIG. 2.

The host interface devices 410-1-410-H include a plurality of host interface device ports 411-1-411-H (collectively, host interface device ports 411), respectively, each of which supports M communication paths (denoted as CP-1 through CP-M for each of the host interface device ports 411). The I/O slots 420-1-420-I include a plurality of I/O slot ports 421-1-421-I (collectively, I/O slot ports 421), respectively, each of which supports M communication paths (denoted as CP-1 through CP-M for each of the I/O slot ports 421). The retimer switch 430 includes a plurality of crossbar retimers 431-1-431-M (collectively, crossbar retimers 431).

The crossbar retimers 431 each support a plurality (e.g., H total, where H is equal to the number of host interface devices 410) of host-facing communication paths (denoted as CP-1 through CP-H for each of the cross-bar retimers) and any of the M communication paths of any of the host interface device ports 411-1-411-H may be connected to any of the H host-facing communication paths of any of the M crossbar retimers 431. The crossbar retimers 431 each support a plurality (e.g., I total, where I is equal to the number of I/O slots 420) of I/O-facing communication paths (denoted as CP-1 through CP-I for each of the cross-bar retimers) and any of the M communication paths of any of the I/O slot ports 421-1-421-I may be connected to any of the I I/O-facing communication paths of any of the M crossbar retimers 431. It is noted that, although primarily presented herein with respect to an example in which H, I, and M are related, in at least some implementations H, I, and M may not be related (e.g., various communication paths of various host interface devices 410 may be communicatively connected to various communication paths of various I/O slots 420 via various communication paths of crossbar retimers 431 which may be disposed within retimer switch 430).

The crossbar retimers 431 each may connect any of the host-facing communication paths of the crossbar retimer 431 to any of the I/O-facing communication paths of the crossbar retimer 431 via crossbar switching. Accordingly, the crossbar retimers 431 of retimer switch 430 may connect any of the M communication paths of the host interface devices 410 to any of the M communication paths of any of the I/O slots 420. The number of communication paths (M) which may be supported by expansion bus device 400 may depend on various factors, such as the type of expansion bus architecture used by expansion bus device 400. For example, where expansion bus device uses a PCIe expansion bus architecture (again, in which the communication paths are typically referred to as lanes), M may be 1 lane, 2 lanes, 4 lanes, 8 lanes, 16 lanes, or 32 lanes. An example of expansion bus device 400 in which M=16 (and H=4 and I=8) is depicted and described with respect to FIG. 5.

Although primarily depicted and described in FIG. 4 with respect to an example in which the expansion bus device 400 includes specific numbers of host interface devices 410 (namely, H) and specific numbers of I/O slots 420 (namely, I) supported by a specific number of crossbar retimers 431 (namely, M, where M is also the number of communication paths supported by the host interface devices 410 and the I/O slots 420), other numbers of host interface devices 410, other numbers of I/O slots 420, or other numbers of crossbar retimers 431 may be used. Although primarily depicted and described in FIG. 4 with respect to an example in which the retimer switch 430 includes crossbar retimers (illustratively, crossbar retimers 431), other types of switching devices other than crossbar retimers may be used. The expansion bus device 400 may be configured in other ways and still be used as expansion bus device 130 of FIG. 1.

Figure 5:
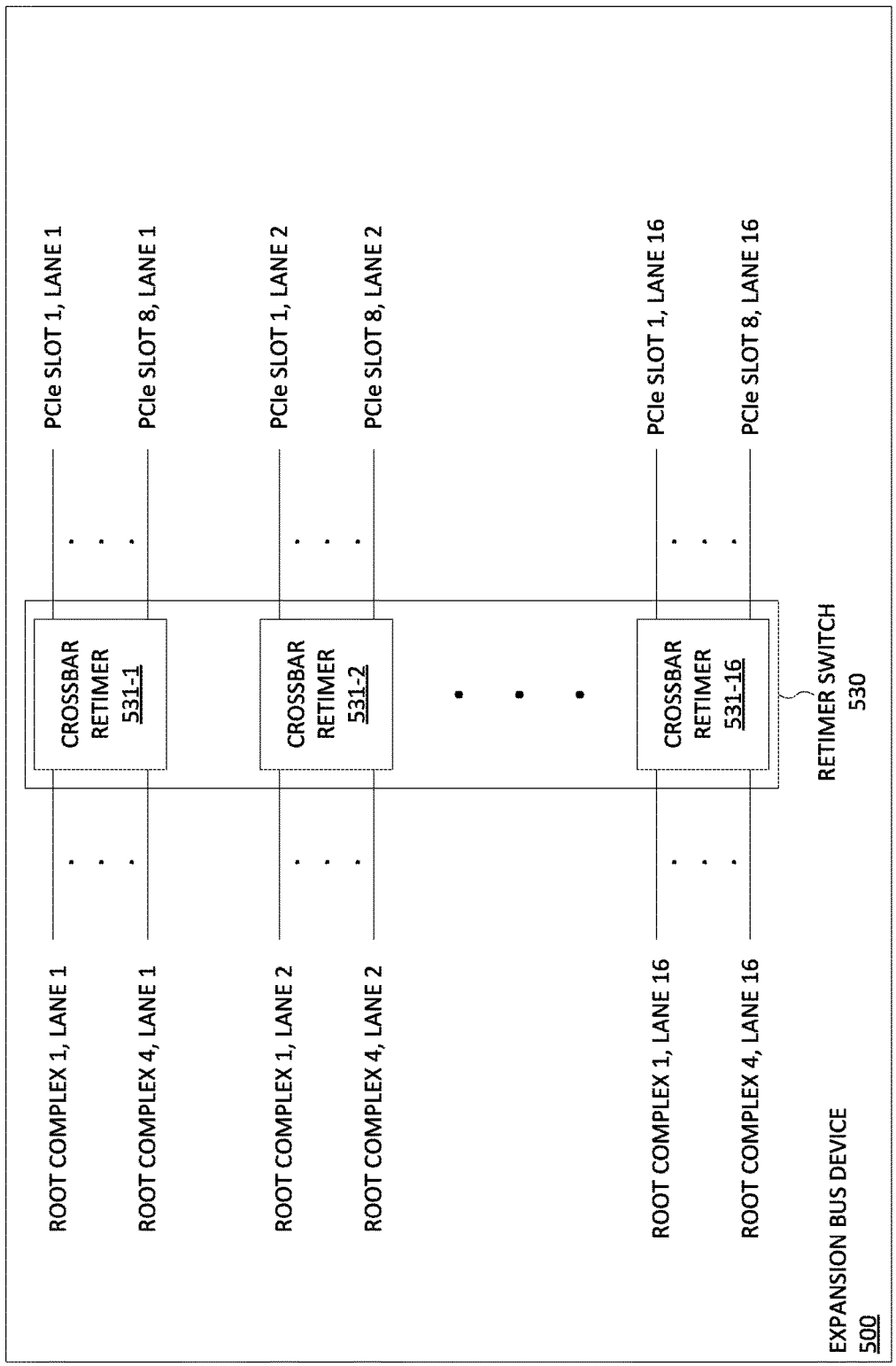
FIG. 5 is a block diagram of an example expansion bus device of the present disclosure in which per communication path communication is supported.

FIG. 5 is a block diagram of an example expansion bus device of the present disclosure in which per communication path communication is supported. In one example, expansion bus device 500 may be used as the expansion bus device 130 of FIG. 1. As indicated above, the expansion bus device 500 is an example of the expansion bus device 400 of FIG. 4 in which the expansion bus architecture is a sixteen lane PCIe expansion bus architecture supporting four root complexes (corresponding to PCIe-based implementations of the host interface devices 210 of FIG. 2, but omitted from FIG. 5 for purposes of clarity) and eight PCIe slots (corresponding to PCIe-based implementations of the I/O slots 220 of FIG. 2, but omitted from FIG. 5 for purposes of clarity). A PCIe lane is a dual simplex channel that uses two differential signaling pairs (having four wires or signal traces, which are omitted for purposes of clarity), with one of the pairs being used for receiving data and the other of the pairs being used for transmitting data.

In one example, the retimer switch 530 includes sixteen crossbar retimers 531-1-531-16 (collectively, crossbar retimers 531). As depicted in FIG. 5, the sixteen lanes of each of the four root complexes and the sixteen lanes of each of the eight PCIe slots are indicated for purposes of illustrating the manner in which the lanes of the root complexes and the lanes of the PCIe slots are communicatively connected. The retimer switch 530 communicatively interconnects lanes of the root complexes and lanes of the PCIe slots via the crossbar retimers 531.

The retimer switch 530 is configured such that the first lanes (Lane 1) of the four root complexes are connected to the four host-facing communication paths of a first crossbar retimer 531-1, the second lanes (Lane 2) of the four root complexes are connected to the four host-facing communication paths of a second crossbar retimer 531-2, and so forth, with the sixteenth lanes (Lane 16) of the four root complexes being connected to the four host-facing communication paths of a sixteenth crossbar retimer 531-16.

The retimer switch 530 is configured such that the first lanes (Lane 1) of the eight PCIe slots are connected to the eight I/O-facing communication paths of the first crossbar retimer 531-1, the second lanes (Lane 2) of the eight PCIe slots are connected to the eight I/O-facing communication paths of the second crossbar retimer 531-2, and so forth, with the sixteenth lanes (Lane 16) of the eight PCIe slots being connected to the eight I/O-facing communication paths of the sixteenth crossbar retimer 531-16.

In this configuration, as depicted in FIG. 5, various lanes of the root complexes may be connected to various lanes of the PCIe slots, thereby providing greater flexibility in communications between the root complexes and the PCIe slots. For example, the first crossbar retimer 531-1 is configured such that the first lanes (Lane 1) of any of the four root complexes may be connected to any of the PCIe slots (illustratively, to the first lanes of any of the PCIe slots). Similarly, for example, the second crossbar retimer 531-2 is configured such that the second lanes (Lane 2) of any of the four root complexes may be connected to any of the PCIe slots (illustratively, to the second lanes of any of the PCIe slots). It will be understood that the other crossbar retimer 531 are similarly configured with, for example, the sixteenth crossbar retimer 531-16 being configured such that the sixteenth lanes (Lane 16) of any of the four root complexes may be connected to any of the PCIe slots (illustratively, to the sixteenth lanes of any of the PCIe slots).

Although primarily depicted and described in FIG. 5 with respect to an example in which the expansion bus device 500 includes specific numbers of root complexes (namely, H=4) and specific numbers of PCIe slots (namely, I=8) supported by a specific number of crossbar retimers 531 (namely, M=16, where M is also the number of communication paths supported by the root complexes and the PCIe slots), various other numbers of elements (e.g., other numbers of root complexes, other numbers of PCIe slots, other numbers of crossbar retimers 531, or the like) may be used within the expansion bus device 500 (i.e., providing different implementations of the expansion bus device 400 of FIG. 4). Although primarily depicted and described in FIG. 5 with respect to an example in which the expansion bus architecture of expansion bus device 500 is a 16-lane PCIe expansion bus architecture, the expansion bus device 500 may be implemented using various other expansion bus architectures (e.g., a PCIe expansion bus architectures having fewer or more lanes, expansion bus architectures other than PCIe expansion bus architectures, or the like). Although primarily depicted and described in FIG. 5 with respect to an example in which the retimer switch 530 includes crossbar retimers (illustratively, crossbar retimers 531), other types of switching devices other than crossbar retimers may be used. The expansion bus device 500 may be configured in other ways and still be used as expansion bus device 400 of FIG. 4.

Figure 6:
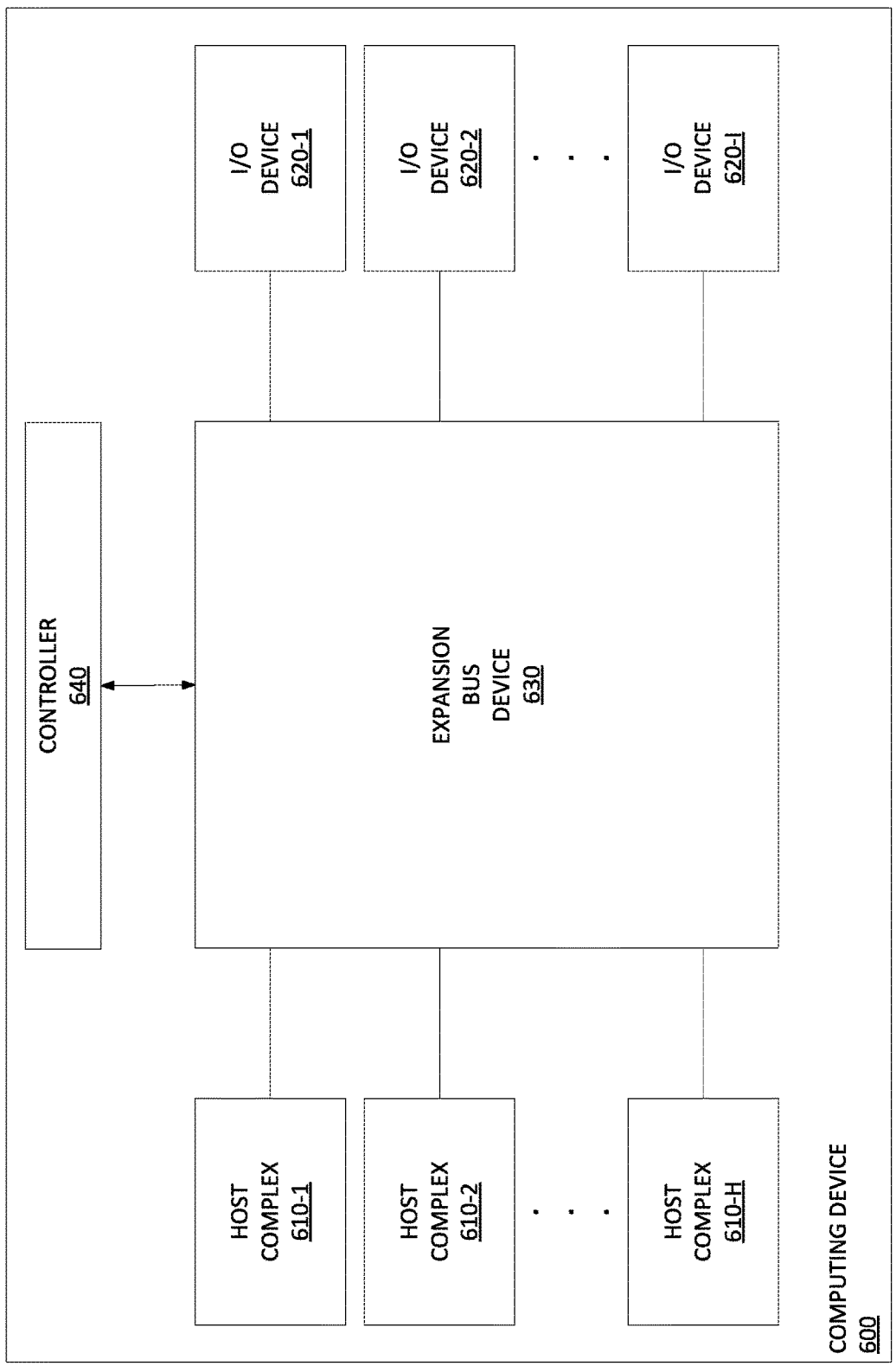
FIG. 6 is a block diagram of an example computing device including an expansion bus device of the present disclosure.

FIG. 6 is a block diagram of an example computing device including an expansion bus device of the present disclosure. The computing device 600 is similar to the computing device 100 of FIG. 1. The computing device 600 includes a plurality of host complexes 610-1-610-H (collectively, host complexes 610), a plurality of I/O devices 620-1-620-1 (collectively, I/O devices 620), an expansion bus device 630, and a controller 640.

The host complexes 610, the I/O devices 620, and the expansion bus device 630 of FIG. 6 are similar to the host complexes 110, the I/O devices 120, and the expansion bus device 130 of FIG. 1, respectively. The controller 640 is communicatively connected to the expansion bus device 630. It is noted that, in some implementations, the controller 640 also may be communicatively connected to the host complexes 610 and the I/O devices 620.

The controller 640 controls the configuration of expansion bus device 630. The controller 640 controls the configuration of a switching fabric of expansion bus device 630 (e.g., the retimer switch 230 of the expansion bus device 200 of FIG. 2) and, thus, to control the manner in which the host complexes 610 and the I/O devices 620 are communicatively connected to each other within the expansion bus device 630. The controller 640 may control the configuration of a switching fabric of expansion bus device 630 at various levels of granularity (e.g., on a port level, at a communication path level, or the like) which, as discussed herein, may depend on factors such as the type of expansion bus architecture used by expansion bus device 630, the level of switching flexibility to be provided for computing device 600, or the like, as well as various combinations thereof. In other words, controller 640 may control the configuration of a switching fabric of expansion bus device 630 so as to support communications between the host complexes 610 and the I/O devices 620 at various different levels of granularity. The controller 640 may configure the expansion bus device 630 at instantiation time and this configuration of expansion bus device 630 may remain unchanged while the computing device 600 operates (e.g., a next reconfiguration of expansion bus device 630 may be performed in conjunction with a next instantiation). The controller 640 may dynamically configure the expansion bus device 630. The controller 640 may dynamically configure the expansion bus device 630 on various time scales. The controller 640 may dynamically configure the expansion bus device 630 responsive to a detected event (e.g., a request from a user, a detection of a failure, removal of an I/O device 620 from an I/O slot of computing device 600, insertion of an I/O device 620 within an I/O slot of computing device 600, or the like). It is noted that expansion bus device 630 may be configured or reconfigured without use of controller 640.

Figure 7:
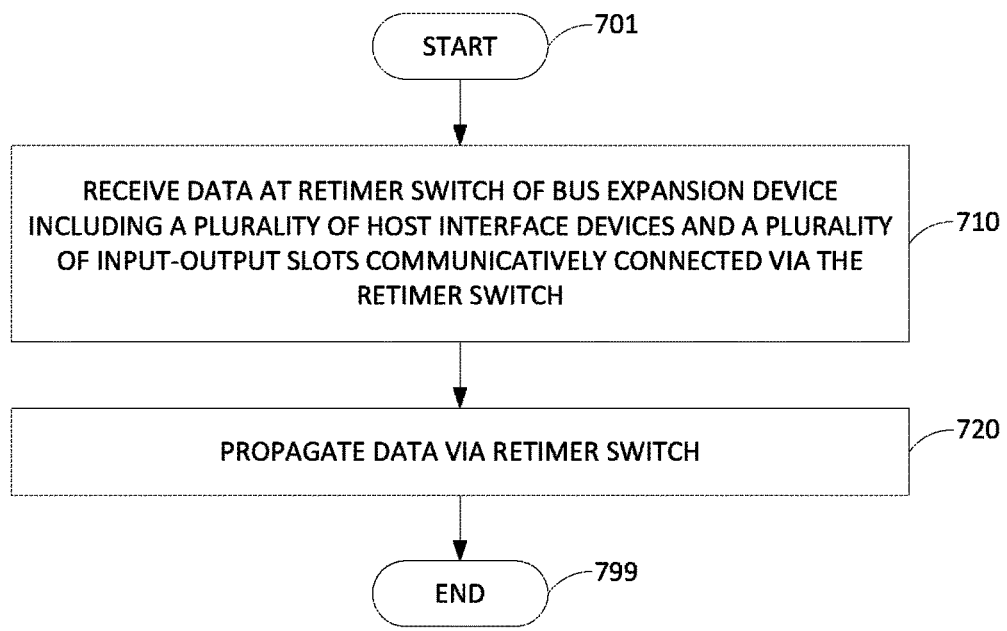
FIG. 7 is a flow diagram of an example method for communicating data within a computing device of the present disclosure.

FIG. 7 is a flow diagram of an example method for communicating data within a computing device of the present disclosure. The computing device includes a plurality of host complexes, a plurality of I/O devices, and an expansion bus device. The expansion bus device includes a plurality of host interface devices, a plurality of I/O slots, and a retimer switch. At block 701, method 700 begins. At block 710, data is received at the retimer switch. The data may be received from one of the host interface devices (e.g., data from a host device that is intended for an I/O device associated with one of the I/O slots) or may be received from an I/O device associated with one of the I/O slots (e.g., data from the I/O device that is intended for a host associated one of the host interface devices). At block 720, the data is propagated via the retimer switch. The data may be propagated toward an I/O device associated with one of the I/O slots (e.g., when the data was received from one of the host interface devices) or may be propagated toward one of the host interface devices (e.g., when the data was received from an I/O device associated with one of the I/O slots). At block 799, method 700 ends.

In further examples, the present disclosure can be extended to provide more flexible configurations of I/O devices (e.g., graphics processing units, programmable logic devices, etc.). For instance, in one example, the present disclosure can be implemented to provide a reconfigurable array of graphics processing units (GPUs). In this case, a second expansion bus device implementing a retimer switch can be used to switch a set of GPUs among multiple configurations. As an example, the second expansion bus device may be implemented based on an expansion bus architecture that is designed to provide high-speed (e.g., faster than 10 megabits per second (Mbps), or several times faster than PCIe architecture) communication between the GPUs, or between the GPUs and at least one CPU. In one example, the expansion bus architecture is based on a proprietary high-speed interconnect architecture, such as the NVLINK point-to-point interconnect developed by Nvidia Corporation, the QUICKPATH INTERCONNECT point-to-point interconnect developed by Intel Corporation, or other similar high-speed point-to-point interconnects developed by other parties. Although referred to herein as a "second" expansion bus device, an expansion bus device used for reconfiguring a set of I/O devices could be used independently of an expansion bus device that connects host devices to the I/O devices.

Figure 8:
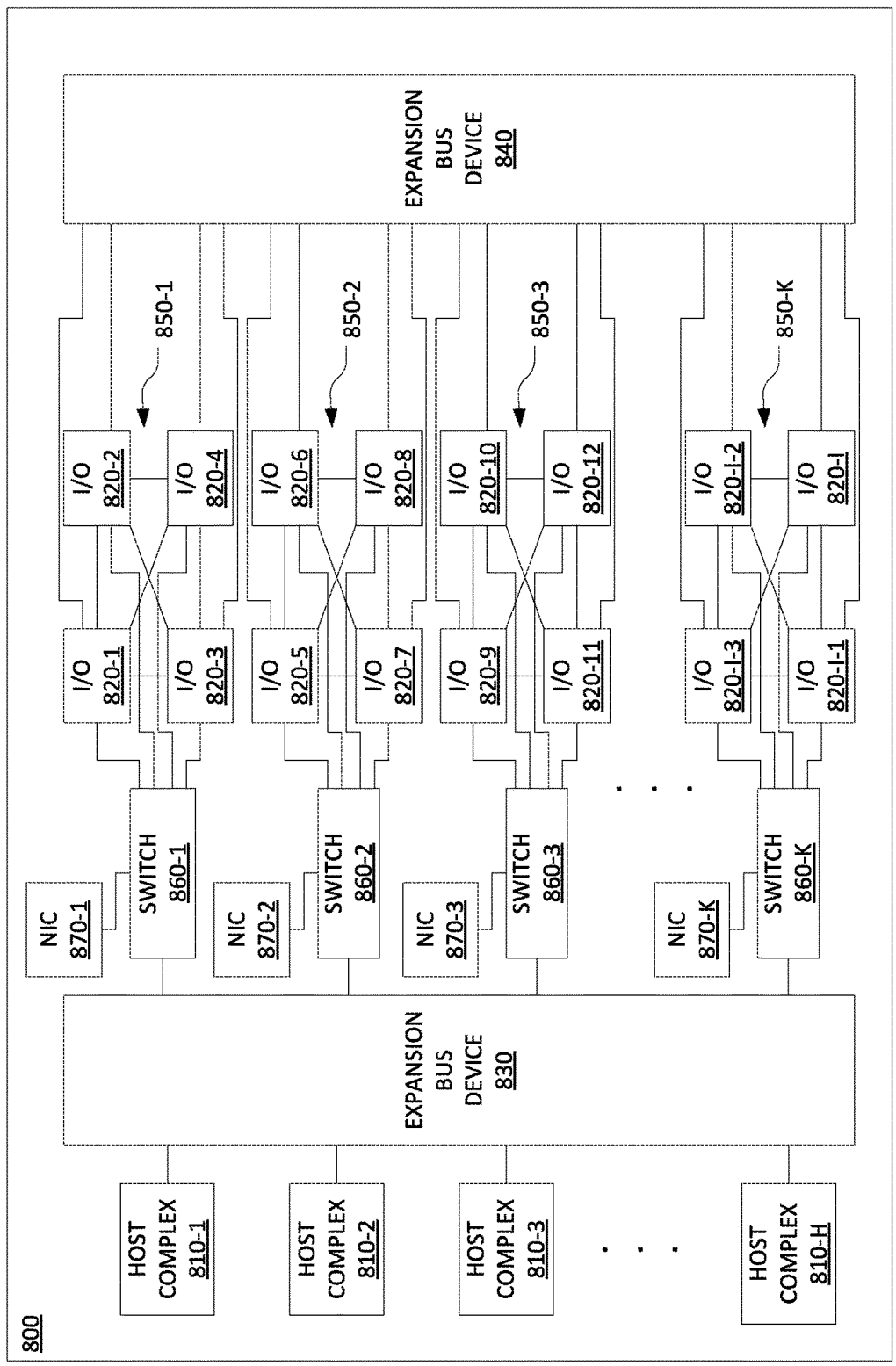
FIG. 8 is a block diagram of an example computing device including an expansion bus device designed to provide flexible configurability of an array input-output devices.

FIG. 8 is a block diagram of an example computing device including an expansion bus device designed to provide flexible configurability of an array input-output devices. The computing device 800 is similar to the computing device 100 of FIG. 1, but includes an additional expansion bus device on the I/O side that allows the I/O devices to be flexibly configured. The computing device 800 includes a plurality of host complexes 810-1-810-H (collectively, host complexes 810), a plurality of I/O devices 820-1-820-I (collectively, I/O devices 820), a first expansion bus device 830, and a second expansion bus device 840.

The host complexes 810 represent groups of host devices of computing device 800. The host complexes 810 may each include at least one host device (e.g., a processor, a memory, or the like), which has been omitted from FIG. 8 for purposes of clarity. For example, a host complex 810 may include a processor, multiple processors, a memory, multiple memories, a controller, or the like, as well as various combinations thereof. The implementation of host complexes 810 may depend on the device type of the computing device 800, as well as other factors. The host complexes 810-1-810-H are communicatively connected to the first expansion bus device 830 via a plurality of host complex interfaces which may support communications between host complexes 810 and the first expansion bus device 830 at various levels of granularity (e.g., per port, per communication path where the ports support multiple communication paths, or the like), which may depend on various factors (e.g., the type of expansion bus architecture used by the first expansion bus device 830, the number of host devices included within each of the host complexes 810, or the like).

The I/O devices 820 are I/O devices which may be used with computing device 800. The I/O devices 820 may be inserted within I/O slots (omitted from FIG. 8 for purposes of clarity) of computing device 800. The I/O devices 820 may provide various functions within the context of computing device 810. The types of I/O devices 820 which may be used by computing device 800 may vary for different implementations of computing device 800. In an example in which computing device 800 is an end user device, the I/O devices 820 may include network interface cards (NICs), storage devices, sound cards, graphics processors, or the like, or combinations of any of these devices. In an example in which computing device 800 is a server, the I/O devices 820 may include server blades, storage devices, or the like. In an example in which computing device 800 is a packet switch, the I/O devices 820 may include line cards, storage devices, or the like. The I/O devices 820 may include various other types of I/O devices. In one particular example, the I/O devices are graphics processing units (GPUs) or programmable logic devices such as field programmable gate arrays (FPGAs).

In one example, the I/O devices 820 are arranged in an array, as illustrated in FIG. 8. The array may be divided into a plurality of subsets 850-1-850-K (collectively, subsets 850) of I/O devices 820. Each subset 850 includes a plurality of I/O devices 820, such as a plurality of GPUs. The I/O devices 820 in a subset 850 may be directly interconnected, as shown in FIG. 8. In one example, each subset 850 further includes a respective switch 860-1-860-K (collectively, switches 860) and a respective network interface card (NIC) 870-1-870-K (collectively, NICs 870). In this example, each I/O device 820 in a subset 850 may be individually and directly connected to the subset's corresponding switch 860. The switch 860 for a subset 850 may also be directly connected to the subsets corresponding NIC 870. In one example, the switch 860 includes a port multiplier.

The I/O devices 820-1-820-I are communicatively connected to the first expansion bus device 830 via a first plurality of I/O device interfaces which may support communications between I/O devices 820 and the first expansion bus device 830 at various levels of granularity (e.g., per port, per communication path where the ports support multiple communication paths, or the like), which may depend on various factors (e.g., the type of expansion bus architecture used by the first expansion bus device 830, the device type of the I/O device 820, or the like). In one example, the switch 860 of each subset 850 of I/O devices 820 directly connects the subset 850 of I/O devices 820 to an I/O device interface of the first expansion bus device 830.

The I/O devices 820-1-820-I are also communicatively connected to the second expansion bus device 840 via a second plurality of I/O device interfaces which may support communications between I/O devices 820 and the second expansion bus device 840 at various levels of granularity (e.g., per port, per communication path where the ports support multiple communication paths, or the like), which may depend on various factors (e.g., the type of expansion bus architecture used by the second expansion bus device 840, the device type of the I/O device 820, or the like). In one example, each of the I/O devices 820 directly connects to an I/O device interface of the second expansion bus device 840.

The first expansion bus device 830 supports communications within the computing device 800. The first expansion bus device 830 supports communications between host complexes 810 and I/O devices 820. As discussed herein, the first expansion bus device 830 is communicatively connected to the host complexes 810-1-810-H via respective host complex interfaces and is communicatively connected to the I/O devices 820-1-820-I via respective I/O device interfaces, for supporting communications between host complexes 810 and I/O devices 820. The first expansion bus device 830 may support bidirectional communications between host complexes 810 and I/O devices 820. The first expansion bus device 830 provides switching of signals between host complexes 810 and I/O devices 820, where the switching may be provided at various granularities (e.g., per port, per communication path, or the like). The first expansion bus device 830 provides retiming functions for signals communicated between host complexes 810 and I/O devices 820. The first expansion bus device 830 may provide signal conditioning for signals communicated between host complexes 810 and I/O devices 820. The first expansion bus device 830 may provide various other functions for signals communicated between host complexes 810 and I/O devices 820. The first expansion bus device 830 may be implemented based on any suitable expansion bus architecture, such as PCI, PCIe, InfiniBand, or the like.

The second expansion bus device 840 also supports communications within the computing device 800. In particular, the second expansion bus device 840 connects I/O devices 820. As discussed herein, the second expansion bus device 840 is communicatively connected to the I/O devices 820-1-820-I via respective I/O device interfaces, for supporting communications between the I/O devices 820. The second expansion bus device 840 may support bidirectional communications between I/O devices 820. The second expansion bus device 840 provides switching of signals between the I/O devices 820, where the switching may be provided at various granularities (e.g., per port, per communication path, or the like). The second expansion bus device 840 is provides retiming functions for signals communicated between the I/O devices 820. The second expansion bus device 840 may provide signal conditioning for signals communicated between the I/O devices 820. The second expansion bus device 840 may provide various other functions for signals communicated between the I/O devices 820. The second expansion bus device 840 may be implemented based on any suitable expansion bus architecture, such as PCI, PCIe, InfiniBand, or the like. In one particular example, the second expansion bus device 840 is implemented based on a high-speed (e.g., faster than 10 megabits per second (Mbps), or several times faster than PCIe architecture) point-to-point interconnect architecture, such as the NVLINK point-to-point interconnect developed by Nvidia Corporation, the QUICKPATH INTERCONNECT point-to-point interconnect developed by Intel Corporation, or other similar high-speed point-to-point interconnects developed by other parties.

The configuration illustrated in FIG. 8 provides a single computing device 800 in which multiple possible configurations of the I/O devices 820 are possible simply by connecting different groups of the I/O devices 820 through the second expansion bus device 840. For instance, the second expansion bus device 840 could be used to connect I/O device 820-1 to any one or more of the other I/O devices 820-2-820-1. In combination with the first expansion bus device 830, this enables any of the host complexes 810 to be connected to anywhere between one and I of the I I/O devices 820. In addition, the second expansion bus device 840 may be used to establish multiple parallel connections between the same pair of I/O devices 820, thereby increasing the bandwidth between the pair of I/O devices 820. Furthermore, the configuration illustrated in FIG. 8 can be implemented to increase the length of a path between devices, allowing for greater device separation. Greater device separation can, in turn, facilitate thermal cooling of the computing device 800, as thermal gradients will be more spread out.

Figure 9:
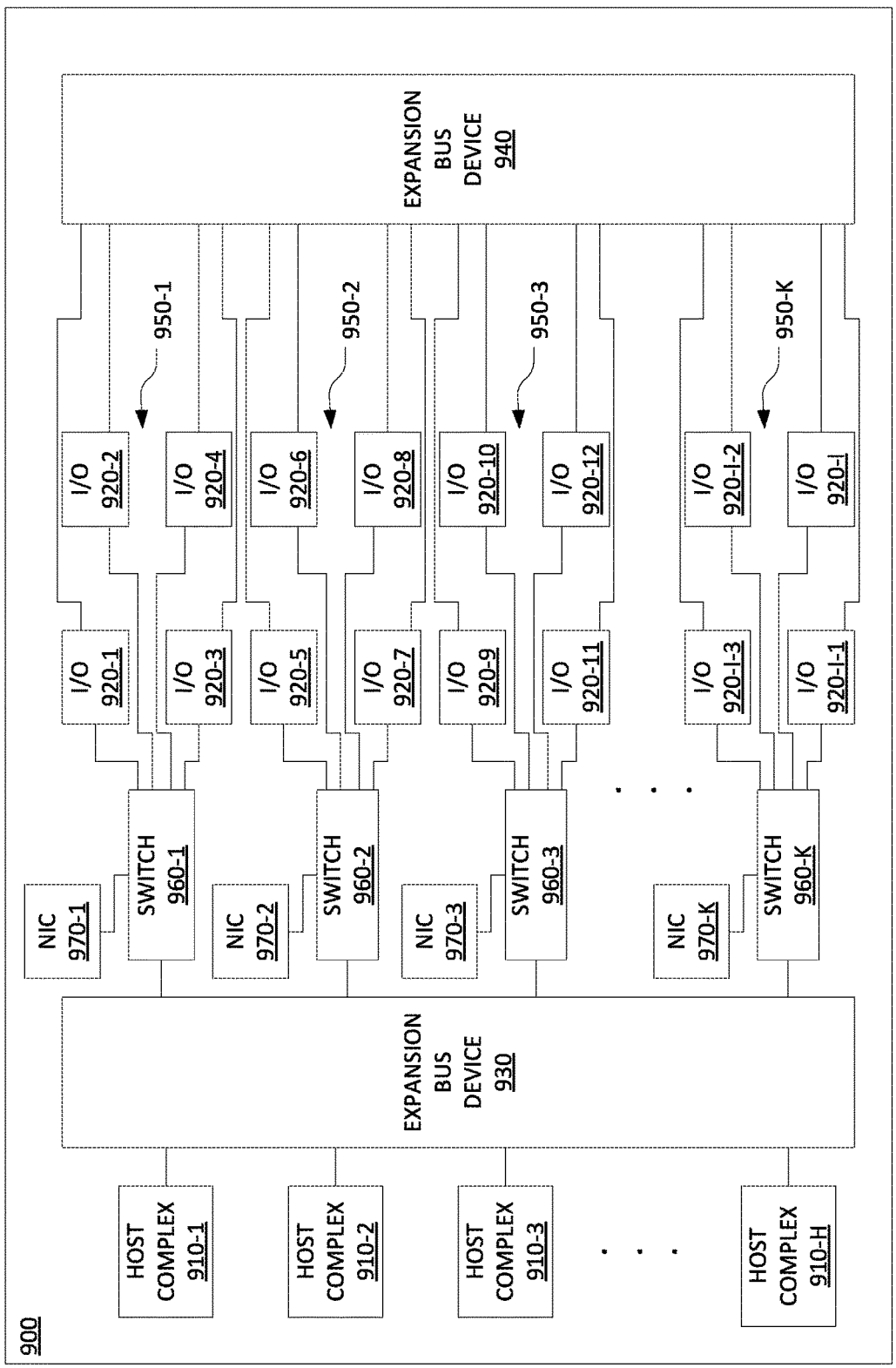
FIG. 9 is a block diagram of an example computing device including an expansion bus device designed to provide flexible configurability of an array input-output devices.

FIG. 9 is a block diagram of an example computing device including an expansion bus device designed to provide flexible configurability of an array input-output devices. The computing device 900 is similar to the computing device 800 of FIG. 1; however, in the case of the computing device 900, the I/O devices in the subsets of I/O devices are not directly interconnected. Thus, the computing device 900 includes a plurality of host complexes 910-1-910-H (collectively, host complexes 910), a plurality of I/O devices 920-1-920-I (collectively, I/O devices 920), a first expansion bus device 930, and a second expansion bus device 940.

The host complexes 910 represent groups of host devices of computing device 900 and may include any combination of the devices described in connection with the host complexes 810 described above. The host complexes 910-1-910-H are communicatively connected to the first expansion bus device 930 via a plurality of host complex interfaces, which may be similar to the host complex interfaces discussed above in connection with the computing device 800.

The I/O devices 920 are I/O devices which may be used with computing device 900. The I/O devices 920 may be inserted within I/O slots (omitted from FIG. 9 for purposes of clarity) of computing device 900. The I/O devices 920 may provide various functions within the context of computing device 910 and may comprise any combination of devices as disclosed above in connection with the I/O devices 820 of FIG. 8.

In one example, the I/O devices 920 are arranged in an array, as illustrated in FIG. 9. The array may be divided into a plurality of subsets 950-1-950-K (collectively, subsets 950) of I/O devices 920. Each subset 950 includes a plurality of I/O devices 920, such as a plurality of GPUs. In the example illustrated in FIG. 9, there are no direct connections between the I/O devices 920 in a subset 950. In one example, each subset 950 further includes a respective switch 960-1-960-K (collectively, switches 960) and a respective network interface card (NIC) 970-1-970-K (collectively, NICs 970). In this example, each I/O device 920 in a subset 950 may be individually and directly connected to the subset's corresponding switch 960. The switch 960 for a subset 950 may also be directly connected to the subsets corresponding NIC 970. In one example, the switch 960 includes a port multiplier.

The I/O devices 920-1-920-I are communicatively connected to the first expansion bus device 930 via a first plurality of I/O device interfaces which may support communications between I/O devices 920 and the first expansion bus device 930 in a manner similar to the first expansion bus device 830 of FIG. 8. In one example, the switch 960 of each subset 950 of I/O devices 920 directly connects the subset 950 of I/O devices 920 to an I/O device interface of the first expansion bus device 930.

The I/O devices 920-1-920-I are also communicatively connected to the second expansion bus device 940 via a second plurality of I/O device interfaces which may support communications between I/O devices 920 and the second expansion bus device 940 in a manner similar to the second expansion bus device 840 of FIG. 8. In one example, each of the I/O devices 920 directly connects to an I/O device interface of the second expansion bus device 940.

The first expansion bus device 930 supports communications within the computing device 900. The first expansion bus device 930 supports communications between host complexes 910 and I/O devices 920 in a manner similar to the first expansion bus device 830 of FIG. 8. The first expansion bus device 930 may be implemented based on any suitable expansion bus architecture, such as PCI, PCIe, InfiniBand, or the like.

The second expansion bus device 940 also supports communications within the computing device 900. In particular, the second expansion bus device 940 connects I/O devices 920, in a manner similar to the second expansion bus device 840 of FIG. 8. The second expansion bus device 940 may be implemented based on any suitable expansion bus architecture, such as PCI, PCIe, InfiniBand, or the like. In one particular example, the second expansion bus device 940 is implemented based on a high-speed (e.g., faster than 10 megabits per second (Mbps), or several times faster than PCIe architecture) point-to-point interconnect architecture.

Similar to the configuration illustrated in FIG. 8, the configuration illustrated in FIG. 9 provides a single computing device 900 in which multiple possible configurations of the I/O devices 920 are possible simply by connecting different groups of the I/O devices 920 through the second expansion bus device 940. However, unlike the configuration illustrated in FIG. 8, the individual I/O devices 920 of FIG. 9 are not directly interconnected to each other. Instead, each I/O device 920 is directly connected to the second expansion bus device 940, which may then be used to connect I/O devices 920 to each other in various configurations. This allows the second expansion bus device 940 to connect any two I/O devices 920 via a one-hop link. In addition, the second expansion bus device 940 may be used to establish multiple parallel connections between the same pair of I/O devices 920, thereby increasing the bandwidth between the pair of I/O devices 920.

Figure 10:
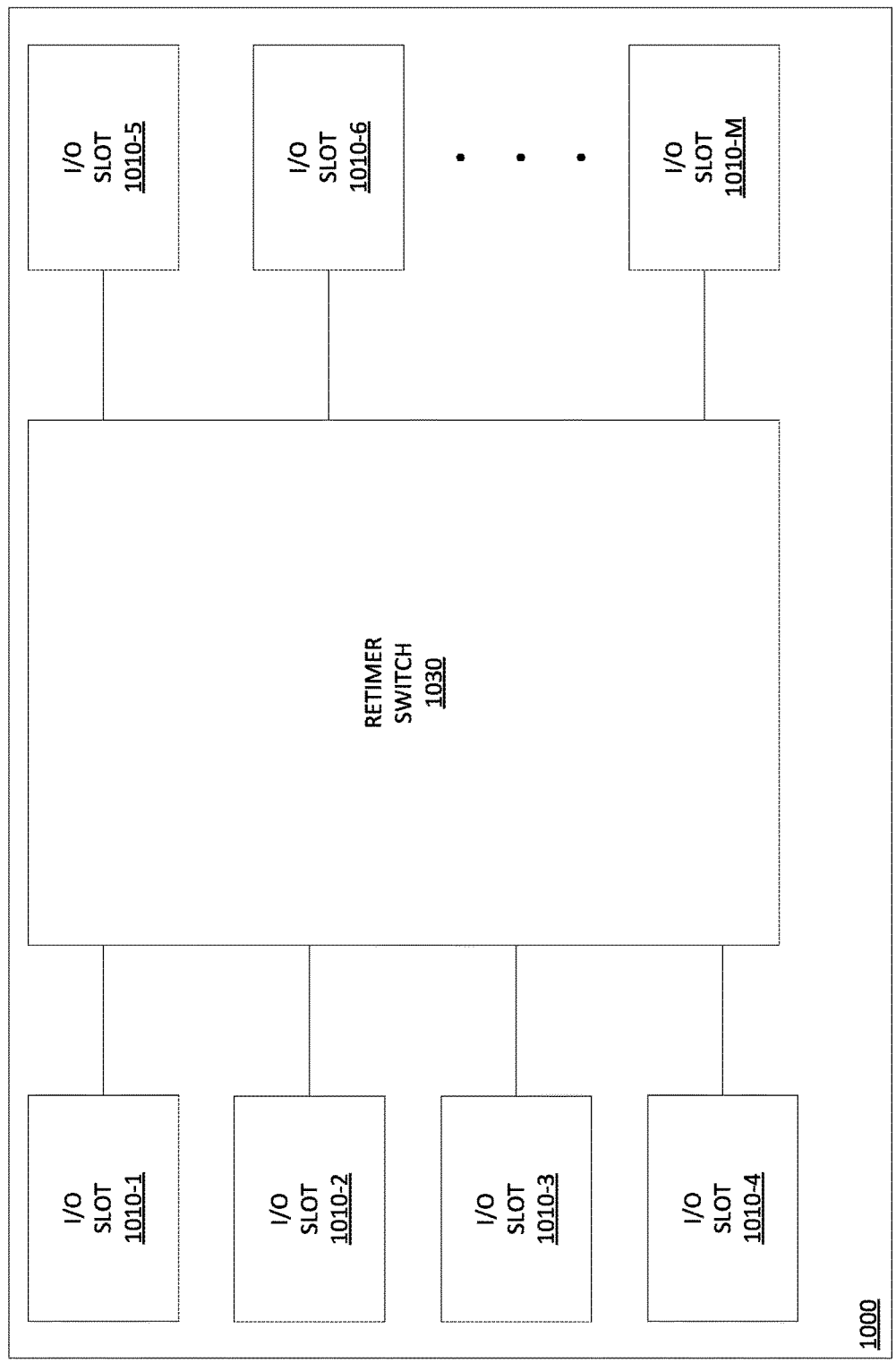
FIG. 10 is a block diagram of an example expansion bus device including a retimer switch of the present disclosure.

FIG. 10 is a block diagram of an example expansion bus device including a retimer switch of the present disclosure. In one example, expansion bus device 1000 of FIG. 10 may be used as the second expansion bus device 840 of FIG. 8 or the second expansion bus device 940 of FIG. 9.

The expansion bus device 1000 includes a plurality of I/O slots 1010-1-1010-M (collectively, I/O slots 1010) and a retimer switch 1030. As discussed herein, expansion bus device 1000 may be implemented using any suitable expansion bus architecture (e.g., PCI, PCIe, InfiniBand, or the like) and the I/O slots 1010 and retimer switch 1030 also may be implemented using any suitable expansion bus architecture. In one particular example, the expansion bus device 1000 is implemented using a high-speed (e.g., faster than 10 megabits per second (Mbps), or several times faster than PCIe architecture) expansion bus architecture, and the I/O slots 1010 and retimer switch 1030 are implemented accordingly.

The I/O slots 1010 receive I/O devices which may be inserted into the I/O slots 1010 (e.g., I/O slots 1010-1-1010-M may receive I/O devices 820-1-820-I of FIG. 8, respectively). The I/O slots 1010 function as communication interfaces between respective I/O devices (omitted from FIG. 10 for purposes of clarity). The I/O slots 1010 are communicatively connected to the retimer switch 1030. The I/O slots 1010 support bidirectional communication between the respective I/O devices via retimer switch 1030. As discussed herein, the I/O slots 1010 may be implemented based on any suitable expansion bus architecture. Although omitted from FIG. 10 for purposes of clarity, each I/O slot 1010 may include at least one I/O slot port which may be physically connected to the retimer switch 1030 (e.g., in a manner similar to that illustrated in FIG. 3 and FIG. 4). It is further noted that each of the I/O slot ports of the I/O slots 1010 may support communication at various granularities, such as per port, per communication path where the ports support multiple communication paths, or the like.

The retimer switch 1030 supports communications within expansion bus device 1000 (and, thus, within a computing device within which expansion bus device 1000 is disposed, such as computing device 800 of FIG. 8 or computing device 900 of FIG. 9). The retimer switch 1030 is communicatively connected to the I/O slots 1010 (and, thus, the associated I/O devices inserted within the I/O slots 1010). The retimer switch 1030 performs switching of signals between the I/O slots 1010 (and, thus, between the I/O devices inserted within the I/O slots 1010). The retimer switch 1030 may include a switching fabric (omitted from FIG. 10 for purposes of clarity) for switching signals between the I/O slots 1010, which may be a crossbar type switching fabric or any other suitable type of switching fabric. The retimer switch 1030 provides retiming for signals communicated between the I/O slots 1010. The retimer switch 1030 may provide signal conditioning for signals communicated between the I/O slots 1010. The retimer switch 1030 may provide various other functions for signals communicated between the I/O slots 1010, which may depend on the type of expansion bus architecture used by the expansion bus device 1000.

The retimer switch 1030, as discussed above, is communicatively connected to the I/O slots 1010. In FIG. 10, this is depicted as a plurality of communication interfaces communicatively connecting the respective I/O slots 1010 and the retimer switch 1030. The manner in which retimer switch 1030 is connected to the I/O slots 1010 may depend on various factors, such as the type of expansion bus architecture used by expansion bus device 1000, the level of switching flexibility to be provided by expansion bus device 1000, or the like, as well as various combinations thereof. In other words, a communication interface that is communicatively connecting an I/O slot 1010 to the retimer switch 1030 may represent at least one physical connection between the I/O slot 1010 and the retimer switch 1030. Accordingly, the communication interfaces depicted in FIG. 10 may represent various ways in which the I/O slots 1010 may be communicatively connected to the retimer switch 1030 in order to support communications between the I/O slots 1010.

Figure 11:
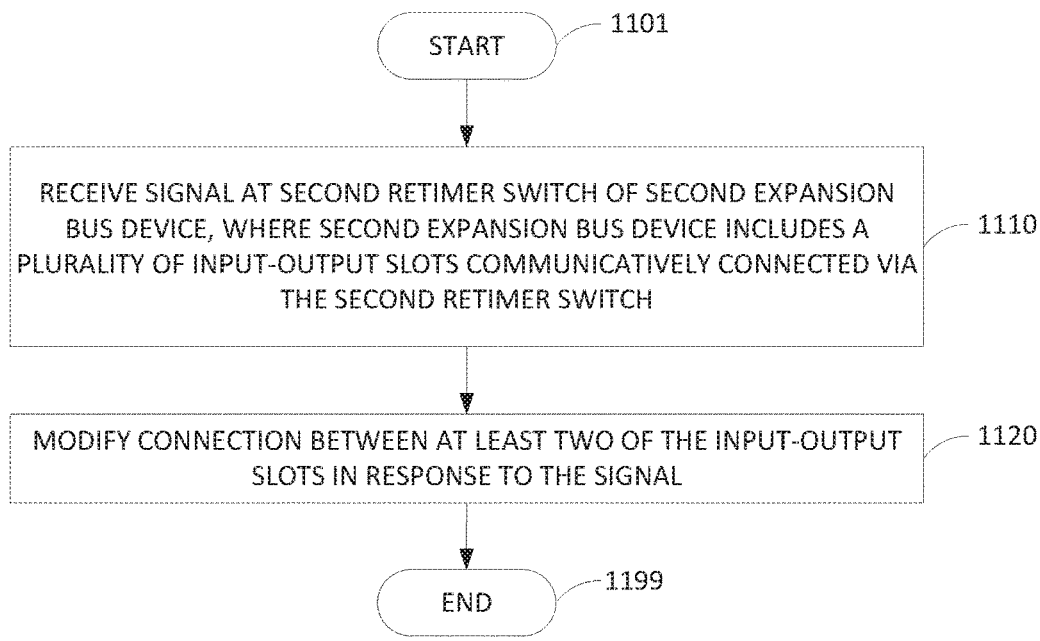
FIG. 11 is a flow diagram of an example method for communicating data within a computing device of the present disclosure.

FIG. 11 is a flow diagram of an example method for communicating data within a computing device of the present disclosure. The computing device includes a plurality of host complexes, a plurality of I/O devices, a first expansion bus device, and a second expansion bus device. The first expansion bus device includes a plurality of host interface devices, a first plurality of I/O slots, and a first retimer switch, while the second expansion bus device includes a second plurality of I/O slots and a second retimer switch.

At block 1101, method 700 begins. At block 1110, a signal is received at the second retimer switch. The signal may indicate an event such as a request from a user, a detection of a failure, a removal of an I/O device from an I/O slot of the second expansion bus device, insertion of an I/O device within an I/O slot of the second expansion bus device, or the like).

At block 1120, a connection between at least two of the I/O slots of the second plurality of I/O slots is modified in response to the signal. The modification may involve connecting another I/O slot to one of the at least two I/O slots or terminating a connection between two of the at least two I/O slots. As another example, the modification may involve implementing an additional connection between two I/O slots that are already connected (e.g., to increase the bandwidth between the two I/O slots). The modification results in the configuration of the I/O devices being altered. At block 1199, method 1100 ends.

Variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   an expansion bus device, comprising:
      a plurality of input-output slots; and
      a retimer switch communicatively connected to each of the plurality of input-output slots to support switching between the plurality of input-output slots, the retimer switch comprising a switch combined with a retimer, and the retimer switch to perform switching of signals between the plurality of input-output slots, and the retimer switch to retime the signals between the plurality of input-output slots; and
   a plurality of input-output devices communicatively coupled to the expansion bus device via the plurality of input-output slots.

2. The apparatus of claim 1, wherein the plurality of input/output devices is arranged into a plurality of subsets, and wherein each subset of the plurality of subsets is communicatively coupled to a respective switch of a plurality of switches.

3. The apparatus of claim 1, wherein the plurality of input/output devices comprises a plurality of graphics processing units.

4. The apparatus of claim 1, wherein the plurality of input/output devices comprises a plurality of programmable logic devices.

5. The apparatus of claim 1, wherein each input-output slot of the plurality of input-output slots comprises a plurality of input-output slot ports.

6. The apparatus of claim 1, wherein the expansion bus device is configurable to support communications between the plurality of input-output slots at a plurality of levels of granularity.

7. The apparatus of claim 5, wherein each of the plurality of input-output slot ports comprises a plurality of communication paths, wherein the retimer switch supports switching between communication paths of the plurality of communication paths of the plurality of input-output slot ports to interchangeably connect the plurality of input-output devices.

8. The apparatus of claim 7, wherein the plurality of communication paths comprises a plurality of high-speed point-to-point connections.

9. The apparatus of claim 6, wherein the plurality of levels of granularity comprise a first level of granularity at which the expansion bus device supports communications on a per-port basis, and a second level of granularity at which the expansion bus device supports communications on a per-communication path basis.

10. The apparatus of claim 9, wherein when the expansion bus device is configured at the second level of granularity, the expansion bus device supports communications on Peripheral Component Interconnect (PCI) Express lanes between the plurality of input-output slots.

11. The apparatus of claim 6, further comprising:
a controller to selectively configure the expansion bus device to a selected level of granularity of the plurality of levels of granularity.

12. A system, comprising:
a first expansion bus device, comprising:
   a first plurality of host interface devices to support a plurality of host devices;
   a first plurality of input-output slots to support a plurality of input-output devices; and
   a first retimer switch communicatively connected to each of the first plurality of host interface devices and to each of the first plurality of input-output slots to support switching between the first plurality of host interface devices and the first plurality of input-output slots, and to retime signals between the first plurality of host interface devices and the first plurality of input-output slots; and
a second expansion bus device, comprising:
   a second plurality of input-output slots to support the plurality of input-output devices; and
   a second retimer switch communicatively connected to each of the second plurality of input-output slots to support switching of signals between the second plurality of input-output slots, and to retime the signals between the second plurality of input-output slots; and
the plurality of input-output devices communicatively coupled to the first expansion bus device via the first plurality of input-output slots and to the second expansion bus device via the second plurality of input-output slots.

13. The system of claim 12, wherein the plurality of input/output devices is arranged into a plurality of subsets, and wherein each subset of the plurality of subsets is communicatively coupled to a respective switch of a plurality of switches.

14. The system of claim 12, wherein the plurality of input/output devices comprises a plurality of graphics processing units.

15. The system of claim 12, wherein the plurality of input/output devices comprises a plurality of programmable logic devices.

16. The system of claim 13, wherein each switch of the plurality of switches communicatively couples a subset of the plurality of subsets to an input-output slot of the first plurality of input-output slots.

17. The system of claim 13, wherein each switch of the plurality of switches comprises a port multiplier.

18. A method, comprising:
receiving a control signal at a retimer switch of an expansion bus device, the expansion bus device comprising a plurality of input-output slots communicatively connected via the retimer switch;
modifying at least one connection connecting at least two of the plurality of input-output slots, in response to the control signal; and
after modifying the at least one connection, switching, by the retimer switch, signals between the plurality of input-output slots, and retiming, by the retimer switch, the signals between the plurality of input-output slots.

19. The method of claim 18, wherein the modifying alters a configuration of a plurality of input-output devices coupled to the expansion bus device via the plurality of input-output slots.

20. The method of claim 18, wherein the retimer switch comprises a switch combined with a retimer.

* * * * *